United States Patent Office 2,875,230
Patented Feb. 24, 1959

2,875,230

PREPARATION OF NEUTRAL MIXED PHOSPHATES FROM TRIALKYL PHOSPHATES AND ALCOHOLS

Harry W. Coover, Jr., and Marvin A. McCall, Kingsport, Tenn., assignors to Eastman Kodak Company, Rochester, N. Y., a corporation of New Jersey No Drawing. Application February 14, 1956
Serial No. 565,305

6 Claims. (Cl. 260—461)

This invention relates to a process for the preparation of neutral mixed phosphates. In a specific aspect this invention relates to a process for preparing neutral mixed phosphates having the structural formula:

$$[RX][R'X][R'X]P=X$$

wherein R and R' are radicals selected from the group consisting of alkyl, aryl, substituted aryl and tetrahydrofurfuryl and wherein X is either oxygen or sulfur.

Neutral mixed phosphates have been prepared by various prior art procedures. For example, such phosphates have been prepared by the reaction of a primary alcohol with phosphorus oxychloride and the resulting phosphoryl dichloride is reacted with sodium phenoxide. Also such phosphates have been prepared by reacting a trialkyl phosphate with an alkyl chlorosulfinate or chloroformate. Another procedure involves the reaction of a chlorophosphate with an alcohol, a phenol or an alkali metal alkoxide. Each of the procedures suffers from some disadvantage. For example, the latter procedure requires the preparation of the chlorophosphate intermediate, which must be isolated and when the chlorophosphate is reacted with an alcohol, a tertiary organic base is required to remove the liberated hydrogen chloride. The only alternative is to react an alkali metal alkoxide with the chlorophosphate, but the yields from this procedure are poor due to competing reactions.

In accordance with this invention, it has been found that neutral mixed phosphates can be produced economically in excellent yields by reacting a phosphate selected from the group consisting of trialkyl phosphates and trialkyl thiophosphates wherein the alkyl radical contains up to 12 carbon atoms per alkyl radical with an alcohol. The products of this invention have the structural formula:

$$[RX][R'X][R'X]P=X$$

wherein R and R' are radicals selected from the group consisting of alkyl containing up to 12 carbon atoms, aryl, substituted aryl and tetrahydrofurfuryl. In these products, R and R' are different and at least one of R and R' is an alkyl radical. X is either oxygen or sulfur. In the reaction, the phosphate is reacted with an alcohol having the structural formula:

R"OH wherein R" is an alkyl radical, for example, methyl, ethyl, propyl, butyl, hexyl, octyl, dodecyl, and the like, an aryl or substituted aryl radical such as phenyl, cresyl, nitrophenyl, chlorophenyl and the like and tetrahydrofurfuryl.

The reaction is carried out for a period of 4 to 24 hours at a temperature of 125 to 225° C. The most desirable reaction period and temperature will, of course, depend upon the reactants employed. To effect the reaction, an ester interchange catalyst is used. Among the catalysts that can be employed are lead oxide ester interchange catalysts, for example, yellow plumbous oxide and red lead oxide. Usually an amount of catalyst within the range of 0.5 to 5 percent by weight of the reaction mixture is used.

The products of this invention are useful as plasticizers, solvents, pesticides, synthetic lubricants and intermediates for the preparation of other organophosphorus compounds. Cellulose esters, plasticized with these mixed phosphates are self-extinguishing.

The following examples wherein the parts are in parts-by-weight illustrate the invention:

*Example 1.—Mixed butyl ethyl phosphates*

A mixture of 36.4 parts of triethyl phosphate, 89.0 parts of n-butyl alcohol, and 5.0 parts of yellow plumbous oxide (litharge) was heated under total reflux for 2 hours. Then low boiling materials were removed from the top of the distillation column within the 76 to 115° C. range for 8 to 12 hours. This distillate consisted of a mixture of ethyl and butyl alcohol. The pot temperature during the reaction ranged from 122° to 148° C. The remainder of the excess butyl alcohol was removed by rapid distillation at atmospheric pressure. After removing the catalyst residue by filtration, the reaction mixture was vacuum distilled. After removing 18.0 parts of unreacted triethyl phosphate, 16.7 parts of neutral, water white, transparent product boiling from 82° to 100° C. at 2.7 mm. was obtained. This mixture can be fractionated to obtain the butyl diethyl and dibutyl ethyl phosphate, but fractionation is unnecessary since the mixture is an excellent plasticizer for cellulose esters. This mixture of butyl ethyl phosphate can be used alone or in combination with other conventional plasticizers to give any desired flow characteristics. Cellulose esters containing 15 to 20 parts of this mixture of phosphates are self-extinguishing.

*Example 2.—Mixed ethyl octyl phosphates*

A mixture of 36.4 parts of triethyl phosphate, 156.0 parts of n-octyl alcohol and 5.0 g. of litharge was reacted according to the procedure in Example 1. No triethyl phosphate was recovered and 52.0 parts of mixed ethyl octyl phosphates boiling from 94° to 132° C. at 2.0 mm. pressure was obtained.

*Example 3.—Mixed methyl phenyl phosphates*

A mixture of 28.0 parts of trimethyl phosphate, 113.0 parts of phenol, and 3.0 parts of litharge was reacted according to the procedure in Example 1 to yield a mixture of methyl phenyl phosphates.

*Example 4.—Mixed cresyl ethyl thiophosphates*

A mixture of 39.6 parts of triethyl thiophosphate, 130.0 parts of p-cresol, and 5.0 parts of litharge was reacted according to the procedure in Example 1 to yield a mixture of cresyl ethyl thiophosphates.

*Example 5.—Mixed dodecyl ethyl thiophosphates*

A mixture of 46.0 parts of triethyl phosphorotrithioate $[(C_2H_5S)_3P=O]$, 223.0 parts of dodecyl alcohol, and 5.0 parts of litharge was reacted according to the procedure in Example 1 to yield a mixture of dodecyl ethyl thiophosphates.

*Example 6.—Mixed ethyl tetrahydrofurfuryl phosphates*

A mixture of 36.4 parts of triethyl phosphate, 122.2 parts of tetrahydrofurfuryl alcohol, and 5.0 parts of litharge was reacted according to the procedure of Example 1 to produce mixed ethyl tetrahydrofurfuryl phosphates.

*Example 7.—Mixed butyl ethyl phosphates*

A mixture of 36.4 parts of triethyl phosphate, 89.0 parts of n-butyl alcohol, and 5.0 parts red lead oxide (minimum, Pb₃O₄) was heated under reflux for 2 hours. The reaction product was then slowly distilled. The low boiling materials were removed from the top of the distillation column within the 76 to 118° C. range for 8 to 10 hours. This distillate consists of a mixture of ethyl and butyl alcohol. The pot temperature during this distillation ranged from 120 to 150° C. The reaction mixture was vacuum distilled, removing approximately 20 parts triethyl phosphate, 15 parts of neutral transparent product boiling from 82 to 100° C. at 2.5 mm. This product which consists of a mixture of butyl diethyl and dibutyl ethyl phosphate was not further fractionated.

We claim:

1. The process of preparing neutral mixed phosphates and thiophosphates having the structural formula:

$$[RX][R'X][R'X]P=X$$

wherein R and R' are radicals selected from the group consisting of alkyl, containing up to 12 carbon atoms, phenyl, cresyl, nitrophenyl, chlorophenyl and tetrahydrofurfuryl, said R and R' being different and at least one of said R and R' being alkyl and wherein X is selected from the group consisting of oxygen and sulfur which comprises reacting a phosphate selected from the group consisting of trialkyl phosphates and trialkyl thiophosphates wherein the alkyl radical contains up to 12 carbon atoms per alkyl radical with an alcohol selected from the group consisting of ROH and R'OH wherein R and R' are defined the same as above, in the presence of a lead oxide ester interchange catalyst.

2. The process of preparing neutral mixed phosphates which comprises reacting triethyl phosphate with n-butyl alcohol in the presence of a lead oxide ester interchange catalyst at a temperature of 125 to 225° C.

3. The process of preparing neutral mixed phosphates which comprises reacting triethyl phosphate with n-octyl alcohol in the presence of a lead oxide ester interchange catalyst at a temperature of 125 to 225° C.

4. The process of preparing neutral mixed phosphates which comprises reacting trimethyl phosphate with phenol in the presence of a lead oxide ester interchange catalyst at a temperature of 125 to 225° C.

5. The process of preparing neutral mixed thiophosphates which comprises reacting triethyl thiophosphate with p-cresyl in the presence of a lead ester interchange catalyst at a temperature of 125 to 225° C.

6. The process of preparing neutral mixed thiophosphates which comprises reacting triethyl phosphorotrithioate with dodecyl alcohol in the presence of a lead oxide ester interchange catalyst at a temperature of 125 to 225° C.

References Cited in the file of this patent

Rueggeberg et al.: "J. Amer. Chem. Society," vol. 70, pp. 1802–1804 (1948).

Kosalopoff: Organo-Phosphorus Compounds, p. 227, sec. VIII, 1950.

Groggins: Unit Processes in Organic Syntheses, pp. 618–19, fourth edition, 1952.

UNITED STATES PATENT OFFICE
CERTIFICATE OF CORRECTION

Patent No. 2,875,230                                              February 24, 1959

Harry W. Coover, Jr. et al.

It is hereby certified that error appears in the printed specification of the above numbered patent requiring correction and that the said Letters Patent should read as corrected below.

Column 4, line 15, claim 5, after "lead" insert -- oxide --.

Signed and sealed this 30th day of June 1959.

(SEAL)
Attest:

KARL H. AXLINE

Attesting Officer

ROBERT C. WATSON
Commissioner of Patents